United States Patent [19]

Benier

[11] Patent Number: 4,565,277
[45] Date of Patent: Jan. 21, 1986

[54] DOUGH TRAY FOR A PRE-PROOFER

[75] Inventor: Johan Benier, Vught, Netherlands

[73] Assignee: Benier B.V., Netherlands

[21] Appl. No.: 166,920

[22] Filed: Jul. 9, 1980

[30] Foreign Application Priority Data

Jul. 13, 1979 [NL] Netherlands ............... 7905494

[51] Int. Cl.⁴ .............................................. B65G 47/42
[52] U.S. Cl. ..................... 198/365; 198/713
[58] Field of Search ............... 198/365, 713, 715, 796, 198/835, 705, 703

[56] References Cited

U.S. PATENT DOCUMENTS

| 1,382,610 | 6/1921 | Streich | 198/713 |
| 1,656,890 | 1/1928 | Schiff . | |
| 2,104,431 | 1/1938 | Marasso | 198/713 |
| 4,140,014 | 2/1979 | Gradoni et al. | 198/835 |

FOREIGN PATENT DOCUMENTS

| 1036183 | 8/1958 | Fed. Rep. of Germany . | |
| 1058444 | 11/1959 | Fed. Rep. of Germany . | |
| 2007439 | 9/1970 | Fed. Rep. of Germany | 198/796 |
| 2032344 | 11/1973 | France . | |
| 7204277 | 10/1972 | Netherlands . | |

Primary Examiner—Douglas D. Watts
Attorney, Agent, or Firm—Brumbaugh, Graves, Donohue & Raymond

[57] ABSTRACT

Dough tray for a proofer, provided with two head walls with means for coupling the dough tray to a chain or the like, an element transporting a plurality of dough trays through the proofer and with a carrier frame extending between the head walls for at least one endless strip of cloth or the like material with a part receiving dough lumps and sagging between two frame portions, provided with positive drive means for displacing the cloth over the frame.

6 Claims, 1 Drawing Figure

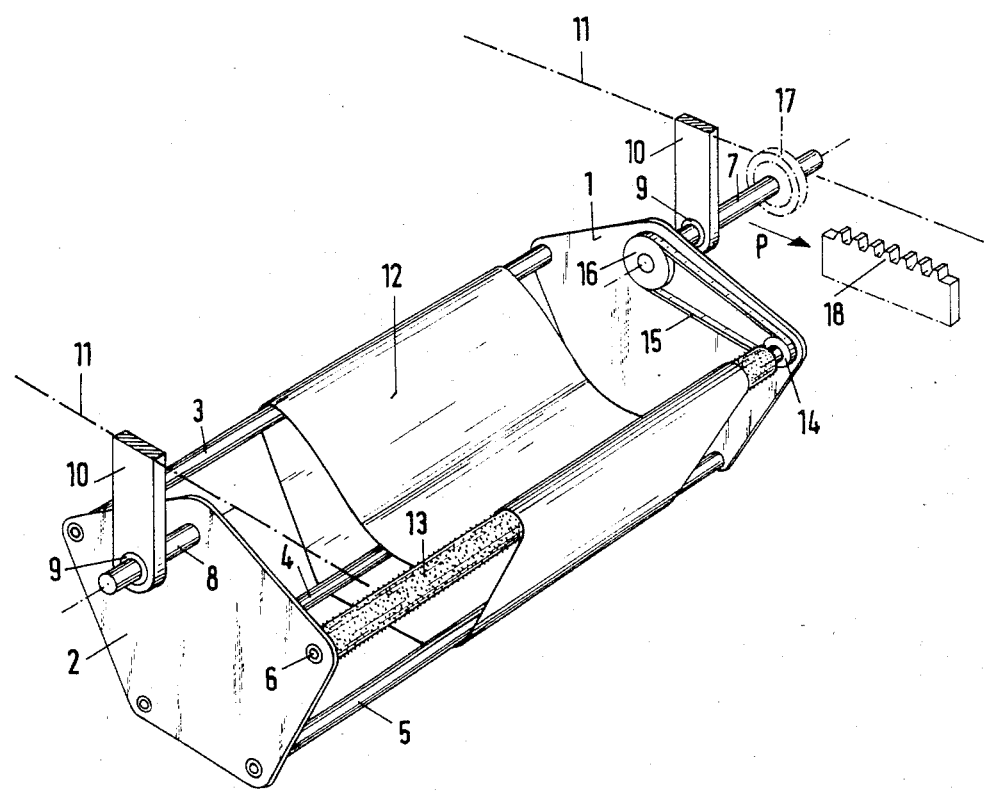

DOUGH TRAY FOR A PRE-PROOFER

The invention relates to a dough tray for a proofer. The type of dough tray to which the invention relates in particular is provided with two head walls with means for coupling the dough tray to a chain or the like, an element transporting a plurality of dough trays through the proofer and having a carrier frame extending between the head walls for at least one endless strip of cloth or the like material, with a part receiving lumps of dough sagging between two frame portions, as described in U.S. Pat. No. 1,382,610.

In a proofer, in particular a pre-proofer, rounded dough is transported in such mostly swingingly suspended dough trays along a path and at a rate depending on the required residence time in the proofer.

As also observed in the U.S. patent, rounded dough has the tendency to adhere to the tray bottom and various proposals have already been made to avoid this. One proposal comprises the transfer of dough lumps into other dough trays with the purpose to each time bring a different part of the lumps into contact with the tray bottoms and walls. The drawback of this method is that a number of dough types is not resistant to shock effects.

Another proposal comprises the application of felt, which has the property that dough has a minimal adherence thereto. A drawback of felt is that it is not hygienic, for it strongly becomes filthy.

A frequently employed separating agent to counteract adherence is flour, however, this may adversely affect the product quality, is unhygienic and has a strong cost-increasing effect, the more so since a flour spraying-operated apparatus has to be cleaned frequently.

The most favourable condition, and this is also proposed in the U.S. patent, is to have the dough lumps rest on a cloth, preferably a thin type that easily dries, since wet textile may become mildewed.

According to the U.S. patent, when discharging dough lumps from the dough tray, the dough tray is tilted and the lumps falling therefrom displace the endless cloth strip over the frame, so that upon a subsequent filling, the dough lumps come to rest on another strip portion. A drawback of the prior art apparatus is that during the transport of dough lumps through e.g. a pre-proofing chamber, the dough lumps may adhere to the carrying cloth portion.

It is the object of the invention to avoid this drawback, to which effect the dough tray according to the invention is characterized by positive drive means for displacing the cloth over the frame. Such displacements of the cloth result in that the lumps resting on the cloth are rolled over in such a careful manner that the dough quality is not adversely affected.

Although various methods of relative cloth displacements relative to the carrying frame are conceivable, a reliable manner of cloth displacement with a frame of the type described in U.S. Pat. No. 1,382,610, so with a plurality of rods extending between the head walls, whereby the dough lump-receiving cloth strip part is sagging between two of said rods, is that wherein according to the invention at least one of the rods is selectively drivable for drawing the cloth strip over the frame.

In that case the drivable rod may be coated with a surface of anti-slip material, while the other rods are smooth and/or mounted for free rotation about their axis in the end walls of the dough tray.

In a preferred embodiment of the invention the drive means comprise a rope transmission with pulleys, one of which being co-rotatably mounted on the drivable rod and the other being mounted co-rotatingly on a shaft which is mounted rotatably in an end wall of the dough tray and fitted with means for selectively rotating the shaft.

According to the invention said shaft rotation can be effectively executed with drive means mounted on the shaft, having the shape of a gear or the like member, whereby in the path of the dough tray rack sections are arranged in the path of the gear. With the dough tray according to the invention revolution of the dough lumps moving through the proofer can be effected at any desired frequency and adjustably, thus avoiding adherence of the dough lumps to the dough tray in an effective manner without requiring the use of techniques such as flour-spraying or the like.

One embodiment of the dough tray according to the invention will now be explained, by way of example, with reference to the accompanying drawing.

The drawing diagrammatically shows an exploded perspective view of a preferred embodiment of the dough tray which is fitted with spaced head walls 1 and 2 which are mounted by four rods 3, 4, 5 and 6 in the head walls. Each head wall is connected through a shaft 7, respectively 8 to a carrier element which in the embodiment shown comprises a bearing bush 9 wherein the respective shafts 7, 8 are received for free rotation, and a bracket or the like element 10, in engagement with diagrammatically shown transport means 11. The transport means 11, e.g. endless chains, are adapted to transport the dough tray in the direction of the arrow p through a pre-proofer (not shown) whereby the dough tray, irrespective of the form of the path, always remains in the depicted upwardly opening position. At the end of the path means may be provided for tipping the dough tray and for discharging dough lumps present therein.

Dough lumps are carried in the dough tray by an endless cloth 12, which is applied about the frame rods 3, 4, 5 and 6 with an upper part receiving dough lumps and sagging between the rods 3 and 6.

While the rods 3, 4 and 5 may have a smooth design, or be mounted for free rotation in the end walls 1 and 2, the rod 6 is fitted with a surface 13 of anti-slip material, or may be so designed that upon rotation of the rod 6 the cloth 12 is entrained.

For the purpose of driving the rod 6 there is mounted at one of the ends a pulley sheave 14 which is connected by a rope 15 to a pulley 16 affixed to the shaft 7. The rotation of the shaft 7 is thus transmitted onto the rod 6. For periodically rotating the rod 7, it may be fitted with a gear 17 affixed thereon, while rack sections 18 may be arranged in the path of the gear. As soon as the gear 17 meets such a rack 18 during the transport of the dough tray the shaft 7 and thereby also shaft 6 is rotated and the cloth strip 12 is displaced over the frame 3-6.

It will be clear that the invention is not restricted to the above described embodiment but that various modifications are possible within the scope of the invention. Essential is that the cloth displacement relative to the frame can be executed at any desired moment.

What I claim is:

1. A dough tray for a proofer comprising two head walls with means for coupling the dough tray to a transport means for transporting a plurality of dough trays through the proofer and a carrier frame means comprising at least two frame portions extending between the head walls for supporting at least one endless strip of cloth, and an endless strip of cloth mounted on said carrier frame means including a part for receiving dough lumps sagging between said two frame portions of the carrier frame means, the improvement wherein positive drive means are provided for selectively displacing the cloth over said carrier frame means for selectively rolling the dough lumps on said endless cloth.

2. A dough tray according to claim 1, wherein the carrier frame means comprises a plurality of rods extending between the head walls, and the cloth strip part receiving the dough lumps is sagging between two of said rods, and at least one of the rods is selectively drivable by said positive drive means for drawing the cloth strip over the carrier frame means.

3. A dough tray according to claim 2, wherein the drivable rod is coated with a surface of anti-slip material, while the other rods are smooth.

4. A dough tray according to claim 2, wherein the drivable rod is coated with a surface of anti-slip material, while the other rods are mounted in the head walls for free rotation about their axes.

5. A dough tray according to any of claims 2, 3 or 4, and further comprising a shaft mounted rotatably in a head wall and fitted with means for selectively rotating said shaft, wherein said drive means comprises a pulley means including at least two pulleys, one of which is co-rotatingly mounted on said drivable rod and the other of which is co-rotatingly mounted on said shaft.

6. An apparatus for processing dough including a plurality of dough trays, a proofer including a support means for supporting a rack means, and transport means for moving said dough trays along a path of movement through said proofer, wherein said dough trays comprise (a) two head walls with means for coupling said dough trays to said transport means,
(b) a carrier frame means comprising at least two rods extending between said head walls for supporting at least one endless strip of cloth, wherein one of said rods is a drivable rod,
(c) an endless strip of cloth on said carrier frame means including a part for receiving dough lumps sagging between said two rods, and
(d) positive drive means for selectively displacing said endless strip of cloth over said carrier frame means for rolling said dough lumps on said endless strip of cloth, said positive drive means including a shaft mounted rotatably in a head wall and having a gear thereon, and coupling means between said shaft and said drivable rod, wherein said gear is arranged to engage said rack means when said dough tray moves along said path of movement thereby rotating said shaft and said drivable rod to draw cloth over said carrier frame means to roll said dough lumps on said endless strip of cloth.

* * * * *